Sept. 12, 1939.  N. T. FOGG  2,172,609
BODY ADJUSTER
Filed June 28, 1938  2 Sheets-Sheet 1
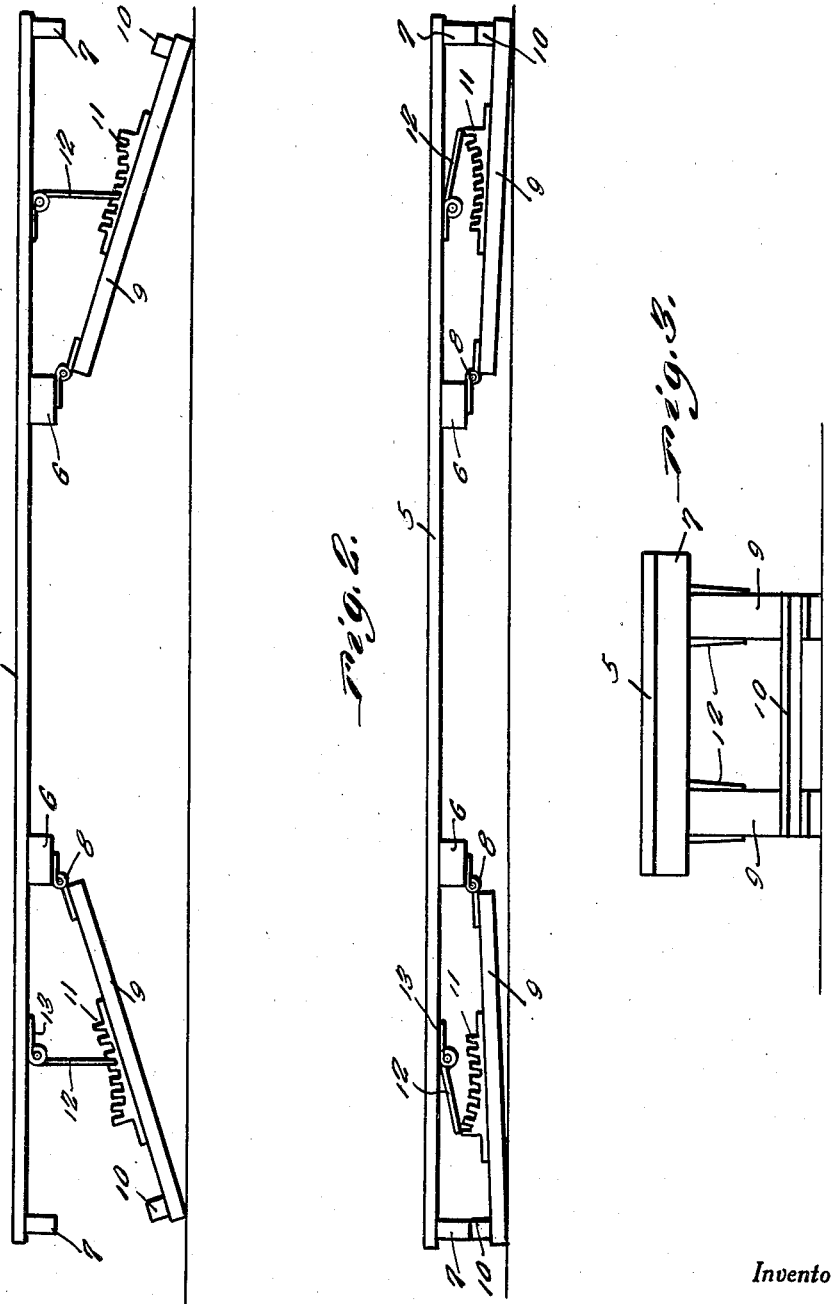
Inventor
N. T. Fogg
By Clarence A. O'Brien
and Hyman Berman
Attorneys Sept. 12, 1939. N. T. FOGG 2,172,609
BODY ADJUSTER
Filed June 28, 1938 2 Sheets-Sheet 2
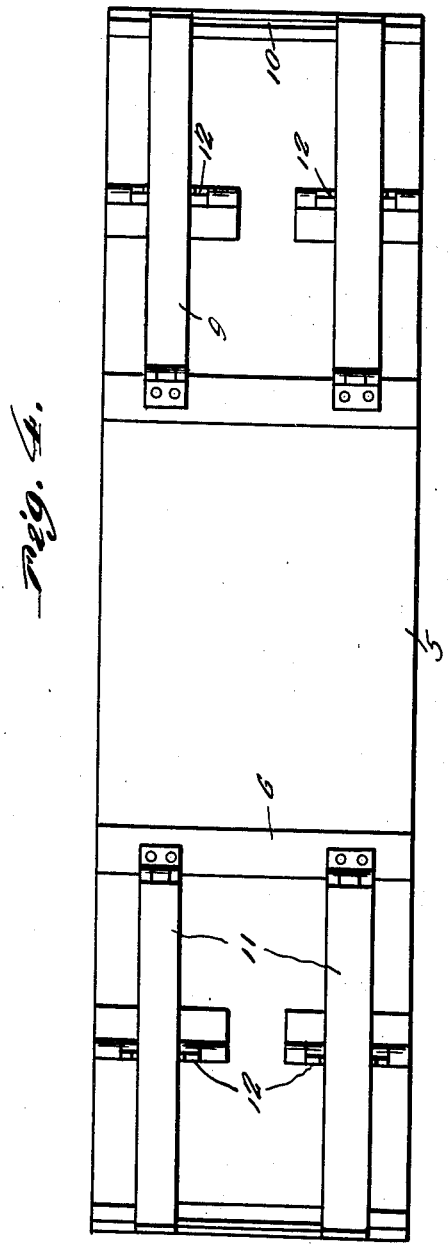
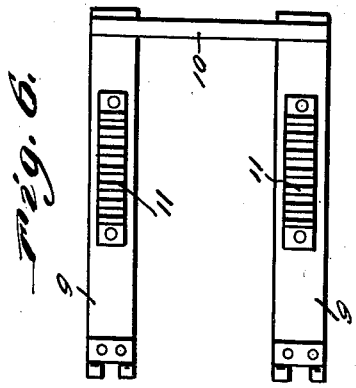
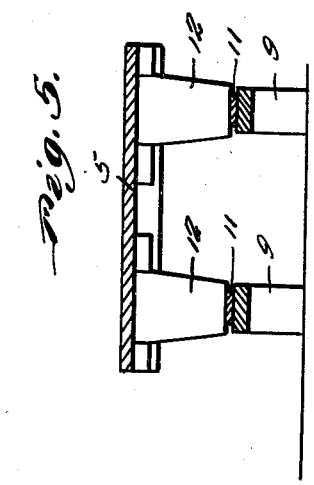
Inventor
N. T. Fogg
By Clarence A. O'Brien
and Hyman Berman
Attorneys Patented Sept. 12, 1939

2,172,609

UNITED STATES PATENT OFFICE 2,172,609

BODY ADJUSTER

Newell T. Fogg, Sanford, Maine

Application June 28, 1938, Serial No. 216,363

1 Claim. (Cl. 27—12)

This invention is what may be termed a "body adjuster", the object of the invention being the provision of a device for adjusting the body (a corpse) to the desired position upon being placed in a casket for burial; and the invention together with its objects and advantages will be best understood from a study of the following description taken in connection with the accompanying drawings wherein:—

Figure 1 is a side elevational view of the adjuster showing the adjuster board supported in raised position.

Figure 2 is a view similar to Figure 1 but with the adjuster board in lowered position.

Figure 3 is an end elevational view of the adjuster as shown in Figure 1.

Figure 4 is a bottom plan view of the adjuster.

Figure 5 is a sectional view through the adjuster, and

Figure 6 is a top plan view of one pair of legs provided in accordance with the present invention.

Referring to the drawings by reference numerals it will be seen that in the preferred embodiment thereof the body adjuster comprises a broad, flat, oblong board 5 of any suitable material and on the underside thereof and inwardly from its ends has secured thereto transverse cleats 6—6. Also secured to the underside of the board 5 adjacent the opposite end edges of the board are transverse cleats 7 for a purpose hereinafter made manifest.

Hinged to each cleat 6 through the medium of suitable hinges 8 are supporting legs 9.

As shown the legs 9 are arranged in pairs, and the legs of each pair at the free ends thereof are connected by a transverse bar or cleat 10 upon which the cleat 7 at the adjacent end of the board 5 rests when the board 5 is in the complete lowered position shown in Figure 2. Thus it will be seen that cleats 7 and 10 cooperate to support the board 5 in a true horizontal position when the board is in the lowered position shown in Figure 2.

For supporting each end of the board 5 at the desired position of angular adjustment relative to the legs 9 at the corresponding ends of the board, each of the several legs of the board has secured to the top side thereof a rack bar 11 with which is cooperable a dog 12 hinged to the underside of the board 5 as at 13. Preferably, and as shown, the toothed edge of each rack bar 11 is slightly concave.

From the above it will be seen that the board 5 may be supported in a raised horizontal position by engaging the dogs 12 with the rack bars 11 in a manner shown in Figure 1.

In a complete lowered position the adjuster board 5 is supported in a horizontal position by reason of the cleats 7 resting on the cleats 10 as shown in said figure.

It will be further apparent that the board 5 may be supported at a desired incline by folding the legs 9 at one end of the board up against the underside of the board with the legs 9 at the opposite end of the board secured through the medium of the rack bars 11 and dogs 12 at the desired position of an angular adjustment relative to the board 5. In this connection it will be appreciated that either end of the board may be supported in a raised position to obtain the desired angle of inclination.

It will be further appreciated that in actual practice the board 5 may be placed in a casket with the body or corpse resting thereon and by positioning the board 5 at the desired position of adjustment the body or corpse will be supported in the casket in the desired position. Thus the device will be found useful as an accessory to morticians for use in the manner suggested.

It is thought that a clear understanding of the construction, utility and advantages of an invention of this character will be had without a more detailed description.

Having thus described the invention what is claimed as new is:

A body adjuster for morticians comprising a flat elongated board, a pair of cleats connected with the underside of the board and spaced a considerable distance from the ends thereof, a second pair of cleats connected with the underside of the board adjacent the ends thereof, a pair of leg members, hinges connecting one of said leg members to a cleat of the first pair and the other leg member to the other cleat of said pair, transverse cleats connected with one side of the leg members adjacent the free ends thereof for engaging the cleats of the second pair when the leg members are in folded position to cause the leg members to hold the board in spaced relation from a surface on which the leg members rest, longitudinally extending rack bars attached to those faces of the leg members which carry the cleats and dogs pivoted to the underside of the board and engaging the rack bars for holding the leg members in different positions with the leg members sloping downwardly and outwardly the toothed portion of each rack bar being of arcuate shape and each dog being located between a cleat of the first pair and a cleat of the second pair.

NEWELL T. FOGG.